United States Patent Office 3,392,082
Patented July 9, 1968

3,392,082
MODIFIED MELAMINE-FORMALDEHYDE RESINS MODIFIED WITH TRIS(2-HYDROXYALKYL) ISOCYANURATES AND LAMINATES MADE THEREWITH
Billy E. Lloyd, Sanford, Maine, and Israel S. Ungar, Baltimore County, Md., assignors to Allied Chemical Corporation, New York, N.Y., a corporation of New York
No Drawing. Filed Apr. 16, 1965, Ser. No. 448,835
9 Claims. (Cl. 161—182)

ABSTRACT OF THE DISCLOSURE

A modified melamine-formaldehyde resin useful in the production of laminate plies for laminates, said resin being prepared by reacting from 1.8 to 3 mols of formaldehyde per mol of melamine having a pH of from about 8 to 10 and at a temperature of from about 50° to 110° C. with 0.01 to 0.2 mols of tris(2-hydroxyalkyl) isocyanurate in which the alkyl group contains from 2 to 4 carbon atoms per mol of melamine.

---

This invention relates to modified melamine-formaldehyde resins and laminates made therefrom, particularly such laminates having post-formability.

Melamine-formaldehyde resins are useful for many purposes including use in forming molding preparations, as impregnants for one or more of the respective plies of laminates in the formation of laminated products such as wall panels, table tops and other decorative surfaces. Such laminates are produced by bonding to a core material comprising, for example, phenol-formaldehyde impregnated kraft paper, including kraft crepe paper, or plywood, hardboard, or particle board, one or more resin-impregnated paper sheets such as sheets of alpha-cellulose. In the production of decorative products, the surface sheets termed the "print" or "pattern" sheets conventionally are alpha-cellulose paper having the desired design printed, embossed or otherwise formed thereon. Melamine-formaldehyde resins are useful as the impregnating resin for the outer plies of such laminates because melamine-formaldehyde is transparent, i.e., lacks inherent color, and results in a laminated product of high gloss and good chemical resistance. The melamine-formaldehyde resin does not discolor or otherwise deleteriously affect the decorative pattern of the print or pattern sheet. Melamine-formaldehyde resin, however, when cured has insufficient residual plasticity to post-form. Laminates made with melamine-formaldehyde resins as the impregnant for the print or pattern sheets or other sheets of the laminate, generally cannot be post-formed, i.e. shaped under heat and pressure to provide curved or other desired non-planar surfaces as may be required, for example, in the case of counter tops, table tops and other decorative items. The cured melamine-formaldehyde resin employed as the binder in such laminates does not have adequate thermoplasticity for post-formability.

Post-forming melamine-formaldehyde impregnated laminates have been prepared by employing melamine-formaldehyde resins containing internal plasticizers or polymerization inhibitors. Such laminates are usually under-cured to produce a laminate which can be post-formed. Under-curing results in products having relatively poor surface quality; often a tendency to yellow occurs and the resistance of the laminate to boiling water may be decreased.

It is a principal object of this invention to provide modified melamine-formaldehyde resins which have thermoplasticity even after curing under curing conditions commonly employed in producing laminates.

It is another object of this invention to provide modified melamine-formaldehyde resins which, among other uses, can be employed to form post-formable laminates.

Another object of this invention is to provide post-formable laminates having at least the surface layer sheet thereof, e.g., the decorative or print sheet, impregnated with the modified melamine-formaldehyde resins of this invention.

Other objects and advantages of this invention will be apparent from the following detailed description thereof.

In this specification, all parts and percentages are given on a weight basis.

The modified melamine-formaldehyde resins of this invention are the reaction products of melamine and formaldehyde in the proportions of from 1.8 to 3 mols of formaldehyde per mol of melamine and having dissolved therein from 0.01 to 0.20 mol of a tris(2-hydroxyalkyl) isocyanurate per mol of melamine, the alkyl group containing 2, 3 or 4 carbon atoms. Such modified melamine-formaldehyde resins, surprisingly, at elevated temperatures have sufficient thermoplasticity, even after the resin has been cured, to produce post-formable laminates in which one or more of the fibrous laminating plies are impregnated therewith. The present invention thus includes the modified melamine-formaldehyde resins as well as the laminates made by impregnating the fibrous ply or layers of the laminate, particularly the decorative or print sheets, with such resins and subjecting the resultant assemblies to heat and pressure to cure the resin and bond the layers of each assembly together to produce the post-formable laminates.

The formaldehyde used can be formaldehyde of commerce, such as Formalin (a solution containing about 37% by weight of formaldehyde in water usually with 10–15% methanol to prevent polymerization), paraformaldehyde, trioxymethylene and other formaldehyde copolymers which decompose to form formaldehyde. The expression "formaldehyde" is used in the claims to include formaldehyde polymers and compounds which release formaldehyde.

The tris (2-hydroxyalkyl) isocyanurates can be prepared by the procedure disclosed in U.S. Patent 3,088,948 granted May 7, 1963, i.e., by reacting cyanuric acid and an alkylene oxide at temperatures of from 25° to 140° C. in the presence of an inert solvent for the cyanuric acid and alkylene oxide, and an alkaline catalyst. The hydroxyalkyl isocyanurate can be the hydroxyethyl, hydroxypropyl or hydroxybutyl isocyanurates or mixtures of any two or all three of these hydroxyalkyl isocyanurates. Tris (2-hydroxyethyl) isocyanurate is preferred.

The melamine and 10–55% aqueous formaldehyde are reacted in the proportions of from 1.8 to 3 mols of formaldehyde per mol of melamine at a pH of from 8 to 10 and at a temperature of from 50° to 110° C. The reaction can be carried out by refluxing the melamine-formaldehyde reaction mixture while agitating until a resin solution results. This resin solution is miscible in water to the extent of about 1 part of resin solution to 0.2–4 parts of water at 25° C. The melamine can be added in one or two steps, i.e., all of the melamine can be mixed with the formaldehyde and the mixture refluxed, or only a portion, say from 60% to 75% and the rest added toward the end of the condensation reaction. While the reaction mixture is till at a temperature of from 50° to 120° C., the tris (2-hydroxyalkyl) isocyanurate is dissolved therein and the resultant reaction mixture cooled to room temperature, producing the modified melamine-formaldehyde resin as an aqueous solution. The modified melamine-formaldehyde resin solution has a water-miscibility of about 1 part of resin solution in 0.2–4 parts of water at 25° C. It preferably contains 40–65 wt. percent resin solids.

When more than 3 mols formaldehyde is used per mol of melamine, the final products tend to be brittle after curing unless a greater amount of tris(2-hydroxyalkyl)isocyanurate is employed than is economically desirable. Less than 1.8 mols of formaldehyde per mol of melamine results in a resin solution having a short storage life.

While the reason for this resinous product having thermoplastic properties after curing is not fully understood, it is believed that the tris(2-hydroxyalkyl) isocanurate retards the curing of the melamine-formaldehyde resin when the latter is subjected to curing conditions. Moreover the tris(2-hydroxyalkyl) isocyanurate reacts slowly with the formaldehyde in the resin to form a resinous copolymer blending with the melamine-formaldehyde resin and imparting thermoplasticity to the resultant resin even when cured. Unreacted tris(2-hydroxyalkyl) isocyanurate dissolved in the resin, it is believed, acts as an internal plasticizer. The net result is that the modified resin thus obtained has adequate thermoplastic properties after curing for it to be used for the impregnation of the fibrous layers or plies of laminates to produce post-formable laminates.

The amount of resin incorporated in the sheets of the laminates depends chiefly on the desired properties of the laminated product. In general, from 35% to 70% of resin based on the weight of the paper, textile or other sheets of the laminate, can be used. The modified melamine-formaldehyde resins of this invention are particularly applicable to the impregnation of the decorative sheet of paper or various textile materials such as cotton, glass or nylon, used as the outer layer or ply of the laminate to produce normally rigid laminates which are post-formable when heated to forming temperatures. Such laminates frequently contain a core consisting of a plurality of paper plies bonded with thermosetting resin, such as the phenolic resins. In some cases these laminates have a core consisting of a board base such as particle board in which cellulosic particles are bonded with a thermosetting resin under high pressures. The expression "fibrous" is used herein in a broad sense to include paper as well as such textiles made from fibers or filaments of nylon, glass or other synthetic textile materials.

The following examples are given for illustrative purposes. It will be understood that this invention is not limited to these examples.

Example I 504 parts of melamine, 974 parts of a 37% formaldehyde solution in water containing from 10% to 15% methanol and 224 parts of water were mixed to form a slurry. The pH of this slurry was adjusted to 9.0 by addition of 20% sodium hydroxide solution and the resultant mixture heated at reflux temperatures (about 100° C.) and under atmospheric pressure with agitation to form a melamine-formaldehyde resin solution which was immiscible in large amounts of water but was water miscible to the extent that one part of the resin solution mixes with 1.4 parts of water to produce a homogeneous solution. To the reaction mixture was added 216 parts of melamine with stirring to dissolve the melamine. To the resultant resin solution at about 100° C. was then added 168 parts of tris(2-hydroxyethyl) isocyanurate, producing a solution which was cooled to room temperature, producing a clear, transparent resin solution, water-miscible to the extent that about one part of resin solution mixes with 1 part of water to produce a homogeneous solution.

Example II

This example differed from Example I only in that 64 parts of tris(2-hydroxyethyl) isocyanurate was dissolved in the melamine-formaldehyde resin instead of the 168 parts employed in Example I.

Example III

This example differed from Example I only in that 32 parts of tris(2-hydroxyethyl) isocyanurate was dissolved in the melamine-formaldehyde resin instead of the 168 parts employed in Example I.

COMPARISON

For comparative purposes, a melamine-formaldehyde resin was produced in the same maner as Example I except that no tris(2-hydroxyethyl) isocyanurate was dissolved in the melamine-formaldehyde resin. This resin is hereinafter referred to as the "Comparative Resin."

Example IV

Laminates were prepared employing respectively the modified melamine-formaldehyde resins of Examples I, II and III and the Comparative Resin. All of these laminates were prepared in substantially the same manner as follows:

Sheets of kraft paper and sheets of kraft crepe paper were each impregnated with a commercial phenol-formaldehyde laminating varnish. Single sheets of bleached kraft paper having a design printed thereon (hereinafter referred to as the "decorative sheets") were each impregnated with a resin solution of Examples I, II and III, and the Comparative Resin, respectively. In each case the resin solution was used without dilution. Single sheets of decorative paper and thin alpha-cellulose paper were each impregnated with the respective resin solutions to give about 45% and 70% resin content respectively. All of the impregnated sheets were then dried to remove excess water. Separate laminates were made, each consisting in order of three sheets of phenol-formaldehyde impregnated kraft crepe, two sheets of phenol-formaldehyde impregnated kraft, one impregnated decorative sheet and one impregnated alpha-cellulose sheet. One such laminate was prepared in which the decorative sheet and the alpha-cellulose paper were impregnated with the modified melamine-formaldehyde resin of each of Examples I, II and III and the Comparative Resin. Each assembly of these sheets was laminated under 1000 p.s.i. pressure at 270–280° F. for 18 minutes. The conditions under which these laminates were produced and hence the resultant laminates were truly comparative, as the same concentration of resin and laminating conditions were employed in all cases, the only difference from one laminate to the next being in the resin employed for impregnating the decorative and alpha-cellulose sheet of each laminate.

Each of the laminates produced employing the modified melamine-formaldehyde resin of Examples I, II and III was an attractive laminate which could be post-formed and was post-formed with the test results given in the table below. The laminated product produced employing the Comparative Resin had markedly less post-formability, so much so that whereas the modified melamine-formaldehyde resins embodying this invention can be used to produce commercially attractive post-formable laminates, the Comparative Resin cannot.

The post-forming test involved sanding the backs of the laminates to produce laminates having a thickness of 0.051±0.004 inch. To each laminate a commercial marking medium melting at 325° C. (Tempilstik) was applied and each laminate placed on a heating jig and heated until the markings were melted. Each specimen was then placed in a bending jig, decorative face down, and subjected to forming pressures for one minute. The specimens were then removed and inspected, with the following results.

TABLE

|  | Percent Tris(2-hydroxy-ethyl) Isocyanurate | Minimum Radius of Bend, Inches |
|---|---|---|
| Example I | 14.7 | 1/2 |
| Example II | 6.25 | 1/2 |
| Example III | 3.1 | 5/8 |
| Comparative Resin | 0.0 | *3/4 |

*Failed.

All of the laminates had an attractive appearance with high surface gloss, and good chemical and physical resistance, particularly in that they do not yellow under atmospheric conditions and are resistant to boiling water.

The substitution of tris(2-hydroxypropyl) isocyanurate or tris(2-hydroxybutyl) isocyanurate for the tris(2-hydroxyethyl) isocyanurate of Examples I, II and III in substantially the same relative amounts produces modified melamine-formaldehyde resins having substantially the same properties, including thermoplasticity, as the respective products of the examples.

It will be noted that the present invention provides modified melamine-formaldehyde resins which have thermoplasticity after curing such as to enable their use in the formation of post-formable laminates.

Since various changes and modifications can be made in this invention as hereinabove described without departing from the scope thereof, the invention is not to be limited to this description except as indicated by the appended claims.

We claim:
1. A modified melamine-formaldehyde resin being prepared by reacting from 1.8 to 3 mols of formaldehyde per mol of melamine having a pH of from 8 to 10 and at a temperature of from 50° to 110° C. with 0.01 to 0.2 mol of tris(2-hydroxyalkyl) isocyanurate in which the alkyl group contains from 2 to 4 carbon atoms per mol of melamine.

2. A modified melamine-formaldehyde resin as defined in claim 1 in which the tris(2-hydroxyalkyl) isocyanurate is tris(2-hydroxyethyl) isocyanurate.

3. A modified melamine-formaldehyde resin as defined in claim 1 in which the tris(2-hydroxyalkyl) isocyanurate is tris(2-hydroxypropyl) isocyanurate.

4. A modified melamine-formaldehyde resin as defined in claim 1 in which the tris(2-hydroxyalkyl) isocyanurate is tris(2-hydroxybutyl) isocyanurate.

5. A post-formable laminate ply comprising a fibrous sheet impregnated with a modified melamine formaldehyde resin containing tris(2-hydroxyalkyl) isocyanurate in which the alkyl group contains from 2 to 4 carbon atoms in an amount sufficient to impart thermoplasticity to the resin in the cured condition, said resin being prepared by reacting melamine and 10–55% aqueous formaldehyde in proportions of from about 1.8 to 3 mols of formaldehyde per mol of melamine at a pH of from about 8 to 10 and at a temperature of from about 50° to 110° C.

6. A post-formable laminate ply as defined in claim 5, in which the tris(2-hydroxyalkyl) isocyanurate is tris(2-hydroxyethyl) isocyanurate.

7. A post-formable laminate ply as defined in claim 5, in which the tris(2-hydroxyalkyl) isocyanurate is tris(2-hydroxypropyl) isocyanurate.

8. A post-formable laminate ply as defined in claim 5, in which the tris(2-hydroxyalkyl) isocyanurate is tris(2-hydroxybutyl) isocyanurate.

9. A post-formable laminate comprising a solid core body having bonded thereto at least one laminate ply comprising a fibrous sheet impregnated with a modified melamine formaldehyde resin containing tris(2-hydroxyalkyl) isocyanurate in which the alkyl group contains from 2 to 4 carbon atoms in an amount sufficient to impart thermoplasticity to the resin the cured condition, said resin being prepared by reacting melamine and 10–55% aqueous formaldehyde in proportions of from about 1.8 to 3 mols of formaldehyde per mol of melamine at a pH of from about 8 to 10 and at a temperature of from about 50° to 110° C.

References Cited

UNITED STATES PATENTS

| 3,088,948 | 5/1963 | Little | 260—248 |
| 3,293,248 | 12/1966 | Sheffer | 260—248 |
| 3,296,207 | 1/1967 | Cummins | 260—67.5 |

WILLIAM H. SHORT, *Primary Examiner.*

H. E. SCHAIN, *Assistant Examiner.*

UNITED STATES PATENT OFFICE
CERTIFICATE OF CORRECTION

Patent No. 3,392,082　　　　　　　　　　　　　　　　　July 9, 1968

Billy E. Lloyd et al.

It is certified that error appears in the above identified patent and that said Letters Patent are hereby corrected as shown below:

Column 6, line 29, after "resin", first occurrence, insert -- in --.

Signed and sealed this 13th day of January 1970.

(SEAL)
Attest:

Edward M. Fletcher, Jr.　　　　　　　　　　　WILLIAM E. SCHUYLER, JR.
Attesting Officer　　　　　　　　　　　　　　　　Commissioner of Patents